United States Patent
Krebs et al.

(10) Patent No.: US 11,734,401 B1
(45) Date of Patent: Aug. 22, 2023

(54) ENVIRONMENT BASED AUTHENTICATION

(71) Applicant: UIPCO, LLC, San Antonio, TX (US)

(72) Inventors: Emily Kathleen Krebs, San Antonio, TX (US); Jose L. Romero, Jr., San Antonio, TX (US); Reynaldo Medina, III, San Antonio, TX (US); Andre Rene Buentello, San Antonio, TX (US); Noe Alberto Martinez, San Antonio, TX (US); Cayley Danielle Collum, San Antonio, TX (US); Christopher Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 503 days.

(21) Appl. No.: 16/825,670

(22) Filed: Mar. 20, 2020

Related U.S. Application Data

(60) Provisional application No. 62/821,580, filed on Mar. 21, 2019.

(51) Int. Cl.
| | |
|---|---|
| G06F 21/32 | (2013.01) |
| G06F 21/31 | (2013.01) |
| H04L 9/40 | (2022.01) |
| G06F 21/34 | (2013.01) |
| H04W 12/06 | (2021.01) |
| H04L 51/52 | (2022.01) |

(52) U.S. Cl.
CPC ............ *G06F 21/32* (2013.01); *G06F 21/316* (2013.01); *G06F 21/34* (2013.01); *H04L 51/52* (2022.05); *H04L 63/0861* (2013.01); *H04W 12/06* (2013.01)

(58) Field of Classification Search
CPC ........ G06F 21/32; G06F 21/316; G06F 21/34; H04L 51/52; H04L 63/0861; H04W 12/06
See application file for complete search history.

(56) References Cited

U.S. PATENT DOCUMENTS

| | | | |
|---|---|---|---|
| 8,752,145 B1 * | 6/2014 | Dotan ................... | G06F 21/32 |
| | | | 726/8 |
| 9,254,798 B1 * | 2/2016 | Mostafa ................ | H04M 3/42 |
| 9,589,118 B2 * | 3/2017 | Agarwal ............... | G06F 21/31 |
| 9,600,733 B1 * | 3/2017 | Wilbert ................ | G06V 20/62 |
| 10,147,319 B1 * | 12/2018 | Chen .................... | B60K 28/06 |
| 10,459,080 B1 * | 10/2019 | Schwesig ............. | G01S 7/412 |
| 10,685,457 B2 * | 6/2020 | Cook .................. | G06V 40/167 |

(Continued)

*Primary Examiner* — Gary S Gracia
(74) *Attorney, Agent, or Firm* — Perkins Coie LLP

(57) ABSTRACT

Authentication techniques are described to allow a person to be authenticated to interact with an organization, where a type of authentication can be determined based on an environment in which the person is located. For example, an authentication server can collect a status information related to a safety setting of a mobile device. The safety setting can be enabled, e.g., if a person is driving a vehicle. When enabled, the safety setting can prevent the person from performing one or more operations on the mobile device. Based on the collected status information, the authentication server can request the person to provide user information via the mobile device so that the authentication server can determine whether the person is authenticated to interact with an organization.

20 Claims, 5 Drawing Sheets

(56) References Cited

U.S. PATENT DOCUMENTS

| | | | | |
|---|---|---|---|---|
| 10,803,158 B2* | 10/2020 | Lee | ............. | H04W 12/30 |
| 10,870,411 B1* | 12/2020 | Schafer | ............. | G07C 9/28 |
| 11,170,084 B2* | 11/2021 | Streit | ............. | G06F 21/32 |
| 2002/0060243 A1* | 5/2002 | Janiak | ............. | G06Q 20/40145 |
| | | | | 235/382 |
| 2012/0033400 A1* | 2/2012 | Remus | ............. | F21S 9/022 |
| | | | | 362/20 |
| 2012/0052762 A1* | 3/2012 | Heller | ............. | A63H 33/22 |
| | | | | 446/147 |
| 2013/0138267 A1* | 5/2013 | Hignite | ............. | G08G 1/0967 |
| | | | | 701/2 |
| 2013/0183957 A1* | 7/2013 | Iwasaki | ............. | H04W 4/80 |
| | | | | 455/420 |
| 2013/0267204 A1* | 10/2013 | Schultz | ............. | G06F 21/32 |
| | | | | 455/411 |
| 2015/0033305 A1* | 1/2015 | Shear | ............. | G06F 21/53 |
| | | | | 726/11 |
| 2015/0121506 A1* | 4/2015 | Cavanaugh | ............. | G06F 21/6218 |
| | | | | 726/16 |
| 2015/0165867 A1* | 6/2015 | Choi | ............. | B60H 1/00757 |
| | | | | 62/157 |
| 2015/0271325 A1* | 9/2015 | Lee | ............. | H04W 4/16 |
| | | | | 455/414.1 |
| 2016/0050203 A1* | 2/2016 | Hefetz | ............. | H04L 51/18 |
| | | | | 726/7 |
| 2016/0152178 A1* | 6/2016 | Peterson | ............. | B60Q 3/80 |
| | | | | 315/77 |
| 2016/0191515 A1* | 6/2016 | Kim | ............. | G06F 7/58 |
| | | | | 726/6 |
| 2016/0200291 A1* | 7/2016 | Kim | ............. | B60R 25/30 |
| | | | | 701/2 |
| 2016/0355122 A1* | 12/2016 | Cotter | ............. | B60Q 1/50 |
| 2017/0104865 A1* | 4/2017 | Skelton | ............. | H04M 1/6075 |
| 2018/0191784 A1* | 7/2018 | Zhang | ............. | H04L 63/205 |
| 2019/0095605 A1* | 3/2019 | Gupta | ............. | G06F 21/36 |
| 2019/0275985 A1* | 9/2019 | Turner | ............. | E05F 15/76 |
| 2019/0306679 A1* | 10/2019 | Duan | ............. | B60Q 9/00 |
| 2020/0003570 A1* | 1/2020 | Marti | ............. | G05D 1/0088 |
| 2020/0231138 A1* | 7/2020 | Burkholz | ............. | B60W 10/30 |
| 2020/0267253 A1* | 8/2020 | Grunfeld | ............. | H04M 1/72463 |
| 2020/0311756 A1* | 10/2020 | Beck | ............. | G09B 5/00 |
| 2020/0334347 A1* | 10/2020 | Hoyos | ............. | H04L 63/0861 |

* cited by examiner

ENVIRONMENT BASED AUTHENTICATION

CROSS-REFERENCE TO RELATED APPLICATIONS

This application claims priority to U.S. Provisional Patent Application No. 62/821,580, entitled "ENVIRONMENT BASED AUTHENTICATION", which was filed on Mar. 21, 2019, the contents of which are incorporated by reference in its entirety herein.

BACKGROUND

Mobile device users use their devices in several different contexts. In many cases, users operate their mobile devices from the safety of their homes or offices to make phone calls or obtain entertainment or work related content via the Internet. However, in other cases, users operate their mobile devices while driving a vehicle. A user may conveniently use his or her mobile device in a vehicle but doing so raises safety concerns. For example, if a user is distracted by the content on a mobile device display, the user may not pay attention to the pedestrians or traffic, which can lead to devastating consequences. To address these safety concerns, companies that provide operating system for mobile device have incorporated a safety feature that can prevent a person from using certain mobile device features while the person is driving a vehicle. When this safety feature is enabled, a user may still be able to perform a limited set of operations such as using voice controls to make phone calls.

Figure 1:
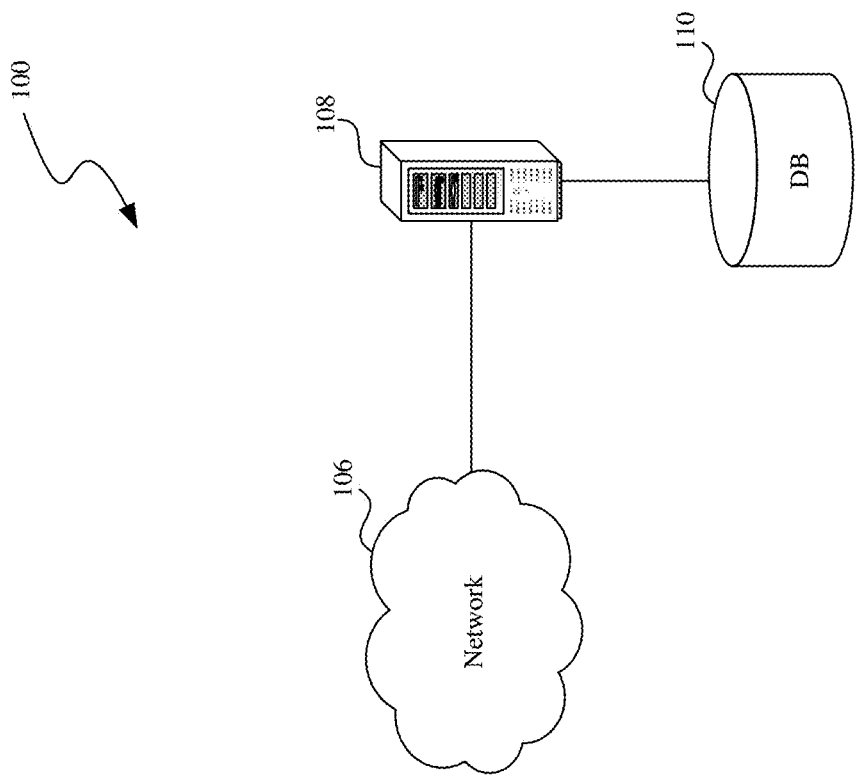
FIG. 1 shows an example authentication system that authenticates a person as he or she is driving in a vehicle.
Figure 1:
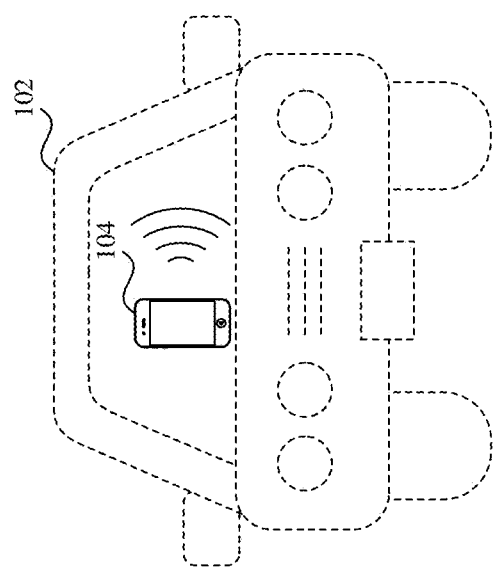

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

This patent document describes authentication techniques to authenticate a person depending on an environment in which the person is located. The described authentication techniques can be tailored to a person's environment so that a person can be authenticated to interact with an organization. Some examples of a person interacting with an organization may include the person requesting information about his or her bank account or bill, or the person requesting to perform a financial transaction. Thus, a technical advantage of the described authentication techniques is that the authentication techniques can be tailored to facilitate a safe and/or effective authentication based on a person's environment.

For example, a person who is calling an organization while driving a vehicle can be authenticated to interact with the organization. In this patent document, the term "drive" or "driving" includes scenarios where a vehicle is moving (e.g., on a freeway) or where a vehicle is stationary (e.g., at a traffic light). Some other examples of environment-based authentication can include authenticating a person located in an environment with loud sounds (e.g., concert) or located in an area with low-light conditions (e.g., cinema theater). For ease of explanation, this patent document describes an example of an environment-based authentication techniques in the context of a person who is driving. The authentication techniques described for the example driving scenario can be applied in other environmental contexts such as when a person is in an environment with certain noise levels or light levels.

FIG. 1 shows an example authentication system 100 that authenticates a person as he or she is driving in a vehicle. The authentication system 100 includes a mobile device 104 located in a vehicle 102 driven by a person. The mobile device 104 may include a smartphone or a tablet used to make or receive phone calls. For example, the mobile device 104 can call or receive a customer service phone number to communicate with a customer service representative. An authentication server 108 may manage or receive information related to the customer service device phone number. Thus, a mobile device 104 can communicate with an authentication server 108 via a network 106 that can include Internet and/or a cellular network.

When a person uses his or her mobile device 104 to call a phone number managed by or associated with the authentication server 108, the authentication server 108 can determine that a phone call is received from the mobile device 104. In some embodiments, the authentication server 108 can also determine the reason for a person's phone call. For example, based on a selection made by a person via the mobile device 104, the authentication server 108 can determine that the person is calling to inquire about his or her account status or a recent transaction. Thus, the phone call from the person can indicate the person's request for an interaction with an organization.

After the authentication server 108 determines that a call is received from a mobile device 104, the authentication server 108 can collect status information related to a safety setting of the mobile device 104. A status information can indicate whether a safety setting is enabled or disabled. The safety setting can be enabled or disabled by the mobile device. The safety setting can be enabled while a user is driving a vehicle. When enabled, the safety setting can prevent the person from performing certain operation(s) on the mobile device 104 while driving the vehicle 102. For example, if the safety setting is enabled, a mobile device 104 may prevent the user from sending and/or receiving text message, browsing the Internet, and/or checking emails on the mobile device 104. In some embodiments, the mobile device 104 does not have a safety setting or does not choose to have it enabled while driving. The authentication server 108 can collect other status information to determine that the person is driving. For example, the mobile device 104 can provide location data from which a speed of the vehicle can be determined. The mobile device 104 can be communicably connected to a vehicle communication system. In some embodiments, the system can determine that the person is actually the driver using proximity in a mesh network of other consumer devices, such as a smart phone, in consistent distance of each other relative to the direction of motion of the vehicle. For example, the person who is in the position closest to the driver's seat can detect devices whose distances are not changing because they're in another vehicle. Such data can be reconciled against the vehicle itself to handle left side versus right side driving. This also can determine the number of passengers in the vehicle as well. Upon receiving the status information, the authentication server 108 can determine that the safety setting is enabled on the mobile device 104 or otherwise determine that the person is driving.

If the authentication server 108 determines that the safety setting is enabled or otherwise that the person is driving, the authentication server 108 can send a message to the mobile device 104, where the message requests the person to provide user information for authenticating that person. In some embodiments, a user information requested from the person when the safety setting is enabled is different from another user information requested from the person when the safety setting is disabled. For example, if the safety setting is enabled, then the person may be requested to provide fingerprint information because doing so may not distract the person from his or her primary responsibility, which is to drive safety. In another example, if the safety setting is disabled, the person may be requested to provide a code send to the person's email address. User information may include biometric information, or it may include a selection of a number and/or color from a plurality of randomly generated numbers and/or colors based on a query to the person. Biometric information may include a person's fingerprint, an audio clip of the person's voice, or a picture of the person's face.

Figure 2B:
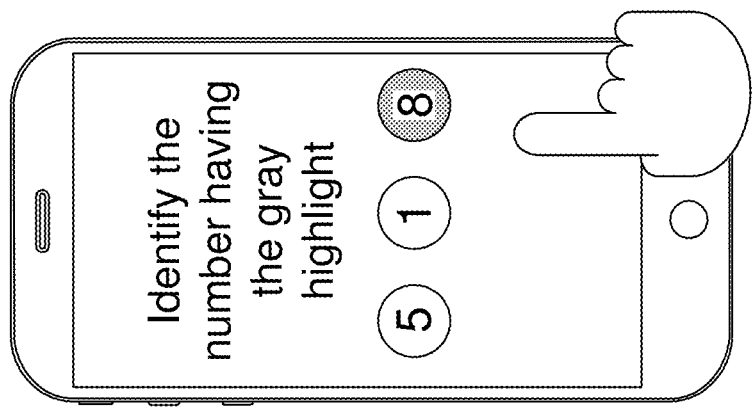
FIGS. 2A and 2B show a person providing user information via a mobile device.
Figure 2A:
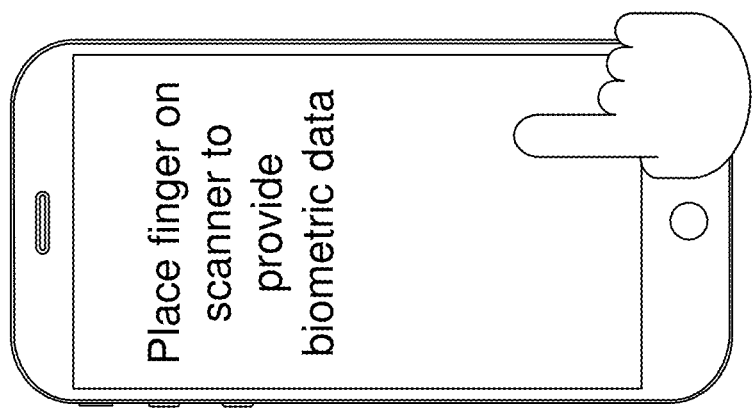

FIGS. 2A and 2B show a person providing user information via a mobile device. FIG. 2A shows a display of a mobile device that receives a message from the authentication server to provide biometric information. In some implementations, instead of requiring the user to read the request for the biometric information, the request is spoken to the user, allowing the user to give full attention to driving. In FIG. 2A, the mobile device can be equipped with a fingerprint scanner. The user can provide fingerprint biometric information to the mobile device via the fingerprint scanner, and the mobile device sends this information to the authentication server for authentication operations as further described below.

FIG. 2B shows another display of a mobile device that receives a message from the authentication server to identify a number or a color from a plurality of numbers or colors. While numbers or colors are shown, other examples such as icons, shapes or other items can be displayed for the same purposes. Instead of one of the items being highlighted, the item can be blinking or otherwise indicated as the item to select. In the example shown in FIG. 2B, the numbers 5, 1, and 8 are displayed, the numbers 5 and 1 are not highlighted, and the number 8 is highlighted. The plurality of numbers and/or colors can be randomly generated by the authentication server. Furthermore, the message sent by the authentication server to the mobile device requests the person to identify one of the numbers or colors from the plurality of numbers or colors. In the example shown in FIG. 2B, the person is requested to identify the number that is highlighted, which is the number 8. When the person selects the number 8 on the display, the mobile device sends to the authentication server, the selection made by the person that identifies the number or color selected by the person. The selection information can be provided as part of user information to the authentication server, where the authentication server uses this information for authentication operations as further described below. In some embodiments, alternative authentication methods can be used. For example, for devices with a camera, a 3D face model can be captured and used for verification. Additionally, other biometrics like voice could be used. Assuming the device has a GPS imbedded, the user can authenticate by selecting their relative location from a list of possibilities (assuming the user gives authorization for location tracking).

Returning to FIG. 1, after the authentication server 108 sends the message, the authentication server 108 can receive from the mobile device 104 the user information. The authentication server 108 can authenticate the person on the phone call if the authentication server 108 can determine that the user information provided by the person is the same as a previously stored user information. For example, if a user provides biometric information, the authentication server 108 can retrieve a previously stored fingerprint information of the person from the database 110, and the authentication server 108 can determine whether the fingerprint information provided by the person during the phone call matches or is the same as the previously stored fingerprint in the database 110.

In another example, the authentication server 108 can send a message to the mobile device 104, where the message includes a plurality of randomly generated numbers or colors to be displayed on the mobile device 104. The message instructs the person to selects a number or color (e.g., highlighted 8 in FIG. 2B). As mentioned above, the correct answer for the query shown in FIG. 2B is to select the number 8, which is highlighted gray. When a person selects a number or color, the mobile device 104 sends this information to the authentication server 108, where the authentication server 108 determines whether the selected number or color matches or is the same as a previously stored number or color. Continuing with the example in FIG. 2B, the highlighted number 8 would be stored in the database 110 after it is randomly generated with the numbers 5 and 1, so that a person's selection can be compared with the correct answer associated with the message sent by the authentication server 108.

Figure 3:
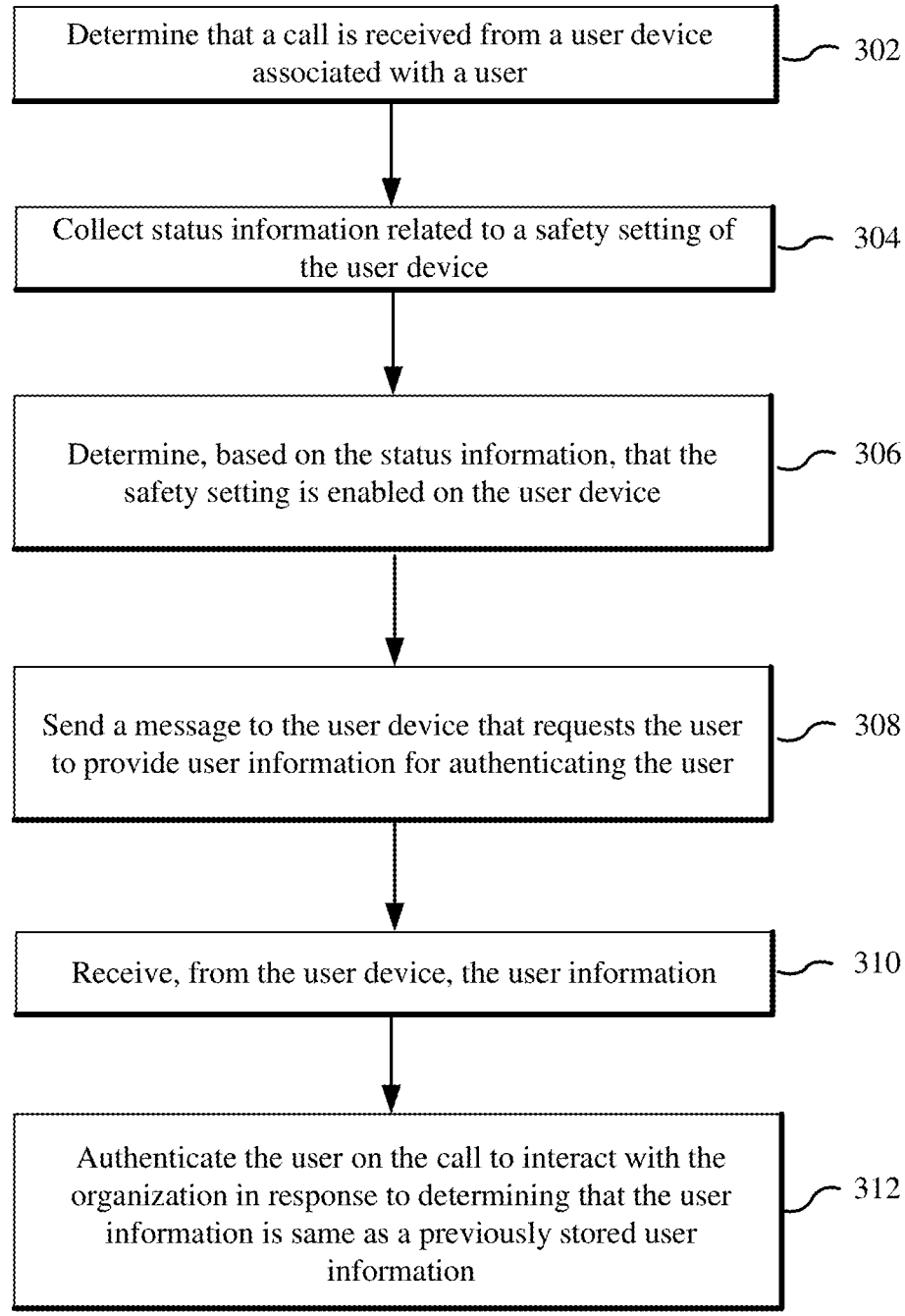
FIG. 3 shows a first example flow diagram to perform an environment-based authentication.

FIG. 3 shows a first example flow diagram to perform an environment-based authentication. At the determining operation 302, an authentication server determines that a call is received from a user device associated with a user, where the call is associated with the user's request for an interaction with an organization.

At the collecting operation 304, the authentication server collects a status information related to a safety setting of the user device. The status information indicates that the safety setting is enabled or disabled, and the safety setting when enabled prevents the user from performing one or more operations on the user device in certain scenarios such as when the user is driving a vehicle. At the determining operation 306, the authentication server determines, based on the status information, that the safety setting is enabled on the user device. In some implementations, the authentication server determines that the user is driving using information other than the safety setting (e.g., travel speed, motion).

At the sending operation 308, if the authentication server determines that the safety setting is enabled or otherwise that the person is driving, then the authentication server sends a message to the user device that requests the user to provide user information for authenticating the user. The user information requested by the authentication server is typically different from user information requested when the safety setting is disabled on the user device or the user is not driving. At the receiving operation 310, the authentication server receives, from the user device, the user information.

At the authenticating operation 312, the authentication server determines that the user on the call is authenticated to interact with the organization in response to determining that the user information is same as previously stored user information. In some embodiments for the method of FIGS. 3 and/or 5, the user information includes the biometric information of the user, and the previously stored user information includes previously stored biometric information of the user. In some embodiments for the method of FIGS. 3 and/or 5, the biometric information includes a fingerprint, an audio clip of the user's voice, or a picture of the user's face. In some other embodiments, the message includes a plurality of randomly generated numbers or colors to be displayed on the user device, the message requests the user to identify one of the numbers or colors from the plurality of randomly generated numbers or colors, the user information includes a selection made by the user that identifies the one of the numbers or colors, and the previously stored user information includes the one of the numbers or colors.

In some embodiments, after the authenticating operation 312, the authentication server can send a second message to a computer operated by customer service representative. The second message can be displayed on the computer and can indicate to the customer service representative that the person who may be calling while driving is authenticated to interact with the organization.

In some embodiments, if the authentication server determines that the user information is not the same as a previously stored user information, then the authentication server can determine that the user on the call is not authenticated to interact with the organization. In such embodiments, the authentication server can send a third message to a computer operated by customer service representative. The third message can be displayed on the computer and can indicate to the customer service representative that the person who may be calling while driving is not authenticated to interact with the organization.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 1 to 3 and 5, and/or in the various embodiments described in this patent document. In another example embodiment, a device that is configured or operable to perform the method(s) described in FIGS. 1 to 3 and 5, and/or in the various embodiments described in this patent document.

Figure 4:
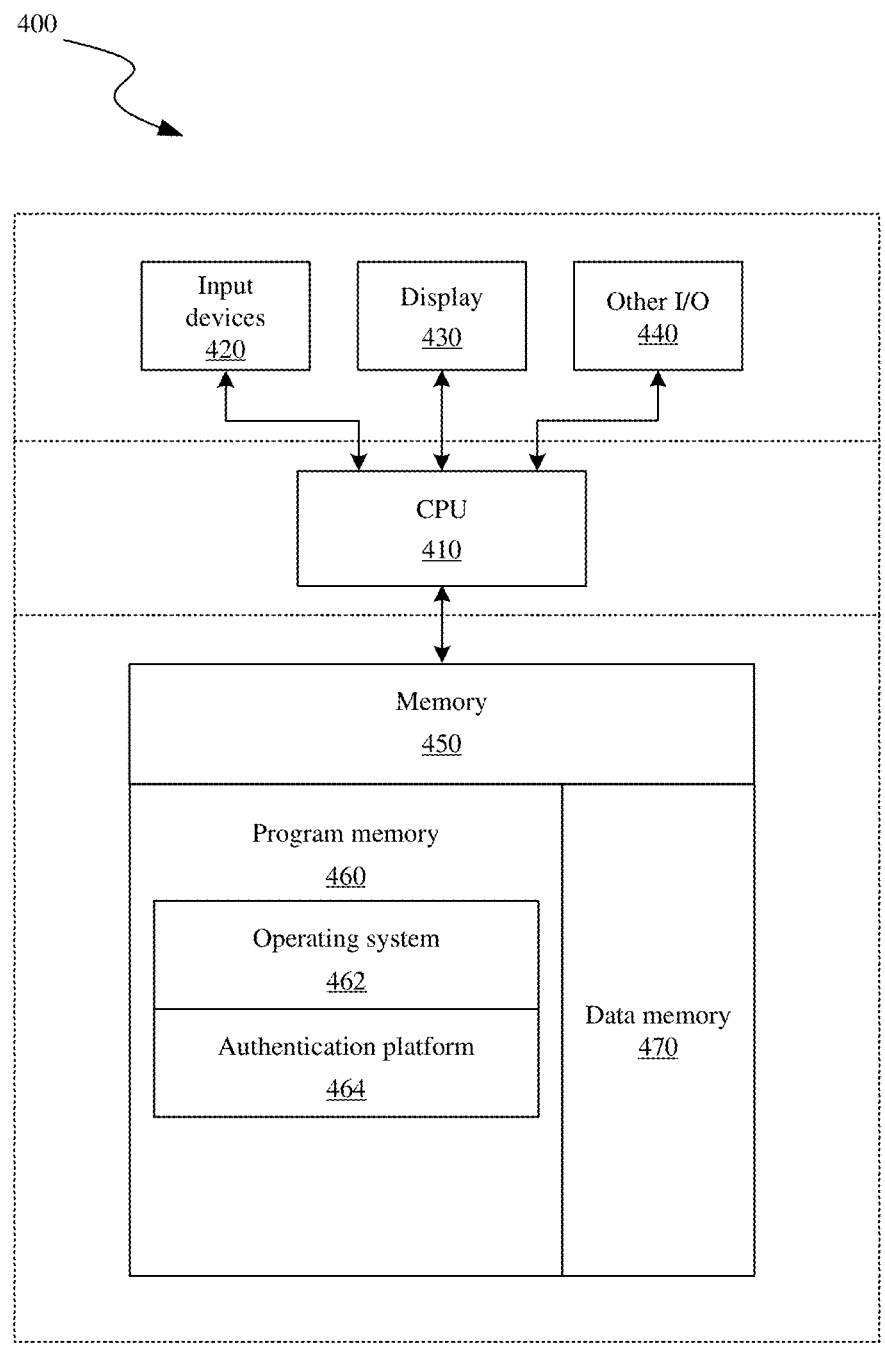
FIG. 4 is a block diagram illustrating an overview of devices on which some implementations of the disclosed technology can operate.

FIG. 4 is a block diagram illustrating an overview of devices on which some implementations of the disclosed technology can operate. The devices can comprise hardware components of a device 400, such as an authentication server, that manages an authentication platform 464. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person (e.g., a customer service representative). In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, the authentication platform 464 that can perform the operations described in FIGS. 1 to 3 and 5, and the various operations associated with the authentication server. Thus, for example, the memory 450 may store instructions that upon execution by CPU 410 configure the device 400 to perform the operations described in FIGS. 1 to 3 and 5 and/or in the various embodiments described in this patent document. Memory 450 can also include data memory 470 that can include status information of the safety setting collected by the authentication server, etc., which can be provided to the program memory 460 or any element of the device 400.

The environment-based authentication techniques described in this patent document can be applicable to several scenarios. The authentication server can obtain from a user device information that can describe the environment in which the user device is located so that the authentication server can determine what type of authentication can be effectively performed by the person. For example, when a person located in an area with loud sounds (e.g., rock concert or construction zone) calls an organization and is requested to authenticate himself or herself, using voice authentication would be ineffective. In this example, if the user device provides a sound level (e.g., in decibels) to the authentication server, and if the authentication server determines that the provided sound level is greater than or equal to a pre-determined threshold value, then the authentication server can determine an appropriate type of authentication (e.g., a fingerprint or a picture of the user's face or a selection of a number or a color from a plurality of randomly generated numbers or colors displayed on the user device), and send a message in which the determined type of authentication is requested.

In another example, when a person located in an area with low lighting conditions (e.g., room with lights turned off) calls an organization and is requested to authenticate himself or herself, using facial authentication would be ineffective. In this example, if the user device provides an amount of light (e.g., detected by a light sensor in the user device) to the authentication server, and if the authentication server determines that the provided amount of light level is less than or equal to a pre-determined threshold value, then the authentication server can determine an appropriate type of authentication (e.g., a fingerprint or an audio clip of the user's voice or a selection of a number or a color from a plurality of randomly generated numbers or colors displayed on the user device (also known as text entry)), and send a message in which the determined type of authentication is requested.

In some embodiments, the information provided by a user device that can be used by the authentication server to determine a type of authentication can include environmental factors, such as speed of travel, noise level, and light level, etc., These environmental factors can be used by the authentication server to determine a type of authentication that is appropriate to the environment in which the person and/or user device is located. The type of authentication can include voice, face recognition, fingerprint, and text entry, etc., In some embodiments, as shown in Table 1 below, the authentication server can store in a lookup table a rules for various environments and the corresponding one or more types of authentication that can be requested from the user. The authentication server can use the lookup table to send a message to a user device requesting any one of the type of authentication for a given environment.

TABLE 1

| Detected Environment | Available Type(s) of Authentication |
|---|---|
| Sound level ≥ 100 db | Face recognition, biometric, text entry |
| Light level ≤ 2 lux | Fingerprint, voice, text entry |
| . . . | . . . |

Figure 5:
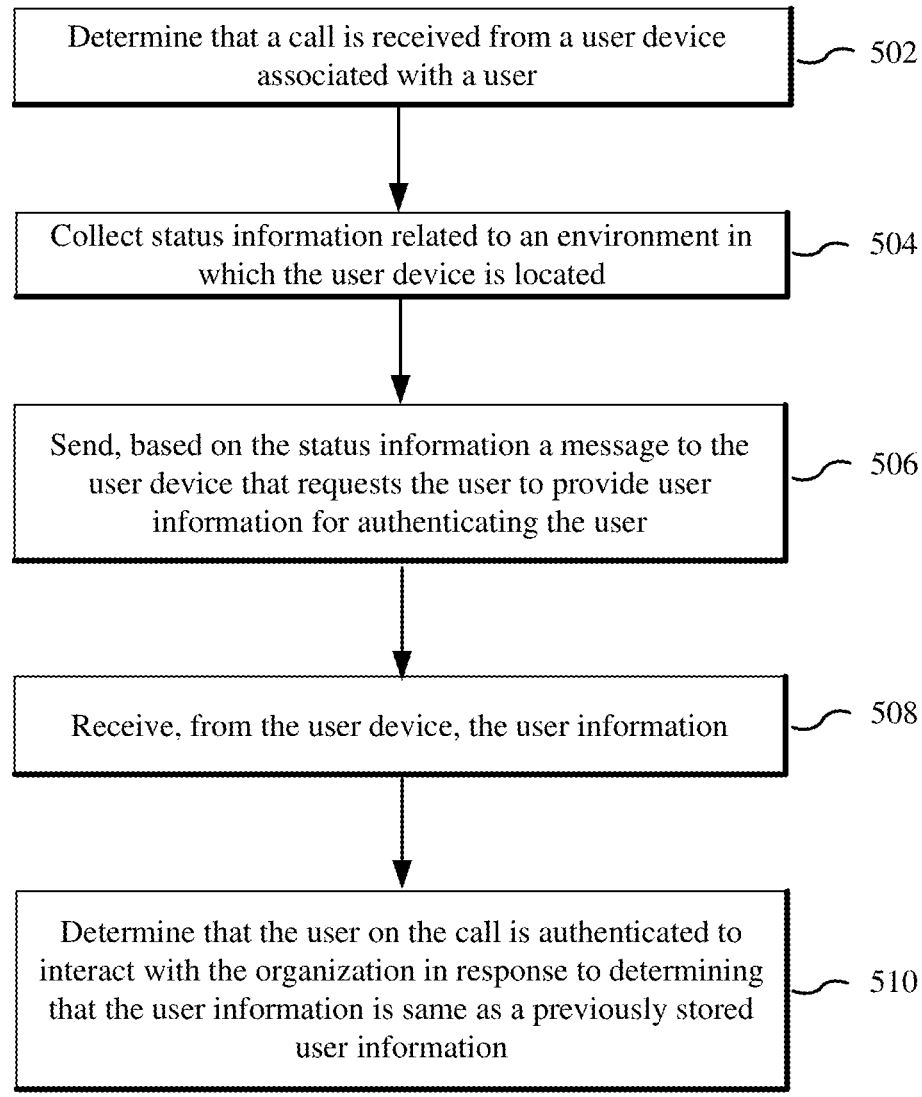
FIG. 5 shows a second example flow diagram to perform an environment-based authentication.

FIG. 5 shows a second example flow diagram to perform an environment-based authentication. At operation 502, the authentication server determines that a call is received from a user device associated with a user, wherein the call is associated with the user's request for an interaction with an organization. At operation 504, the authentication server collects status information related to an environment in which the user device is located. At operation 506, the authentication server sends, based on the status information a message to the user device that requests the user to provide user information for authenticating the user. At operation 508, the authentication server receives, from the user device, the user information. At operation 510, the authentication server determines that the user on the call is authenticated to interact with the organization in response to determining that the user information is same as a previously stored user information.

In some embodiments, the method of FIGS. 3 and/or 5 can further include determining a type of authentication to be performed based on the status information that indicates an environment in which the user device is located, where the status information includes information about an amount of light or sound in the environment, and where the user information requested in the message is based on the type of authentication. In some embodiments for the method of FIGS. 3 and/or 5, the type of authentication is determined to be a fingerprint or an audio clip of the user's voice or a selection of a number or a color from a plurality of randomly generated numbers or colors in response to the amount of light being less than or equal to a pre-determined limit. In some embodiments for the method of FIGS. 3 and/or 5, the type of authentication is determined to be a fingerprint or a picture of the user's face or a selection of a number or a color from a plurality of randomly generated numbers or colors in response to the amount of sound being greater than or equal to a pre-determined limit.

In some embodiments, after the operation 510, the authentication server can send a second message to a computer operated by customer service representative. The second message can be displayed on the computer and can indicate to the customer service representative that the person is authenticated to interact with the organization. In some embodiments, if the authentication server determines that the user information is not the same as a previously stored user information, then the authentication server can determine that the user on the call is not authenticated to interact with the organization. In such embodiments, the authentication server can send a third message to a computer operated by customer service representative. The third message can be displayed on the computer and can indicate to the customer service representative that the person is not authenticated to interact with the organization.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIGS. 1-4 described above, and in each of the flow diagrams, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for performing an environment-based authentication, the system comprising:
a server configured to:
determine that a call is received from a user device associated with a user, wherein the call is associated with a request of the user for an interaction with an organization;
collect, during the call while the user operates a vehicle, status information of the user device, wherein the status information,
indicates that the user device is within a proximity of a driver seat location in the vehicle, and
includes at least one environmental factor for an environment within the vehicle, wherein the at least one environmental factor includes a noise level or a light level;
in response to determining that the user device is within the proximity of the driver seat location in the vehicle and the at least one environmental factor for the environment within the vehicle,
determine, during the call, a type of authentication for authenticating the user based on at least one of the noise level or the light level in the environment within the vehicle;
send, during the call, a message to the user device that requests the user to provide user information according to the type of authentication for authenticating the user;
receive, during the call from the user device, the user information; and authenticate the user on the call to interact with the organization in response to determining that the user information is same as a previously stored user information.

2. The system of claim 1,
wherein the user information includes a biometric information of the user, and
wherein the previously stored user information includes previously stored biometric information of the user.

3. The system of claim 2, wherein the biometric information includes a fingerprint, an audio clip of a voice of the user, or a picture of a face of the user.

4. The system of claim 1,
wherein the message includes a plurality of randomly generated numbers or colors to be displayed on the user device,
wherein the message requests the user to identify one of the numbers or colors from the plurality of randomly generated numbers or colors,
wherein the user information includes a selection made by the user that identifies the one of the numbers or colors, and
wherein the previously stored user information includes the one of the numbers or colors.

5. The system of claim 1, wherein the server is further configured to:
determine the type of authentication to be performed based on the status information that indicates the environment in which the user device is located,
wherein the status information includes information about the noise level or the light level in the environment within the vehicle, and
wherein the user information requested in the message is based on the type of authentication.

6. The system of claim 5, wherein the type of authentication is determined to be a fingerprint or an audio clip of a voice of the user or a selection of a number or a color from a plurality of randomly generated numbers or colors in response to the light level being less than or equal to a pre-determined limit.

7. The system of claim 5, wherein the type of authentication is determined to be a fingerprint or a picture of a face of the user or a selection of a number or a color from a plurality of randomly generated numbers or colors in response to the noise level being greater than or equal to a pre-determined limit.

8. A method of performing an environment-based authentication, the method comprising:
determining that a call is received from a user device associated with a user, wherein the call is associated with a request of the user for an interaction with an organization;
collecting, during the call while the user operates a vehicle, status information of the user device, wherein the status information,
indicates that the user device is within a proximity of a driver seat location in the vehicle, and
includes at least one environmental factor for an environment within the vehicle, wherein the at least one environmental factor includes a noise level or a light level;
in response to determining that the user device is within a proximity of a driver seat location in the vehicle and the at least one environmental factor for the environment within the vehicle,
determining, during the call, a type of authentication for authenticating the user based on at least one of the noise level or the light level in the environment within the vehicle;
sending, during the call, a message to the user device that requests the user to provide user information according to the type of authentication for authenticating the user;
receiving, during the call from the user device, the user information; and
authenticating the user on the call to interact with the organization in response to determining that the user information is same as a previously stored user information.

9. The method of claim 8,
wherein the user information includes biometric information of the user, and
wherein the previously stored user information includes previously stored biometric information of the user.

10. The method of claim 9, wherein the biometric information includes a fingerprint, an audio clip of a voice of the user, or a picture of a face of the user.

11. The method of claim 8,
wherein the message includes a plurality of randomly generated numbers or colors to be displayed on the user device,
wherein the message requests the user to identify one of the numbers or colors from the plurality of randomly generated numbers or colors,
wherein the user information includes a selection made by the user that identifies the one of the numbers or colors, and
wherein the previously stored user information includes the one of the numbers or colors.

12. The method of claim 8, further comprising:
determining the type of authentication to be performed based on the status information that indicates the environment in which the user device is located,
wherein the status information includes information about the noise level or the light level an amount of light or sound in the environment within the vehicle, and
wherein the user information requested in the message is based on the type of authentication.

13. The method of claim 12, wherein the type of authentication is determined to be a fingerprint or an audio clip of a voice of the user or a selection of a number or a color from a plurality of randomly generated numbers or colors in response to the light level being less than or equal to a pre-determined limit.

14. The method of claim 12, wherein the type of authentication is determined to be a fingerprint or a picture of a face of the user or a selection of a number or a color from a plurality of randomly generated numbers or colors in response to the noise level being greater than or equal to a pre-determined limit.

15. A non-transitory machine-readable medium having machine executable instructions stored thereon that, when executed by one or more processors, direct the one or more processors to perform a method of performing an environment-based authentication, comprising:
determining that a call is received from a user device associated with a user, wherein the call is associated with a request of the user for an interaction with an organization;
collecting, during the call while the user operates a vehicle, status information of the user device, wherein the status information, indicates the user device is within a proximity of a driver seat location in the vehicle, and includes at least one environmental factor for an environment within the vehicle, wherein the at least one environmental factor includes a noise level or a light level;

in response to determining that the user device is within a proximity of a driver seat location in the vehicle and the at least one environmental factor for the environment within the vehicle, determining, during the call, a type of authentication for authenticating the user based on at least one of the noise level or the light level in the environment within the vehicle;

sending, during the call, based on the status information a message to the user device that requests the user to provide user information according to the type of authentication for authenticating the user;

receiving, during the call from the user device, the user information; and determining that the user on the call is authenticated to interact with the organization in response to determining that the user information is same as a previously stored user information.

16. The non-transitory machine-readable medium of claim 15, wherein the user information includes biometric information of the user, and wherein the previously stored user information includes previously stored biometric information of the user.

17. The non-transitory machine-readable medium of claim 16, wherein the biometric information includes a fingerprint, an audio clip of a voice of the user, or a picture of a face of the user.

18. The non-transitory machine-readable medium of claim 15, wherein the message includes a plurality of randomly generated numbers or colors to be displayed on the user device, wherein the message requests the user to identify one of the numbers or colors from the plurality of randomly generated numbers or colors, wherein the user information includes a selection made by the user that identifies the one of the numbers or colors, and wherein the previously stored user information includes the one of the numbers or colors.

19. The non-transitory machine-readable medium of claim 15, wherein the method further comprises:

determining the type of authentication to be performed based on the status information that indicates the environment in which the user device is located, wherein the status information includes information about the noise level or the light in the environment within the vehicle, and wherein the user information requested in the message is based on the type of authentication.

20. The non-transitory machine-readable medium of claim 19, wherein the type of authentication is determined to be a fingerprint or an audio clip of a voice of the user or a selection of a number or a color from a plurality of randomly generated numbers or colors in response to the light level being less than or equal to a pre-determined limit.

* * * * *